H. F. Morton,
Drag Rake.
No. 88,325. Patented Mar. 30, 1869.
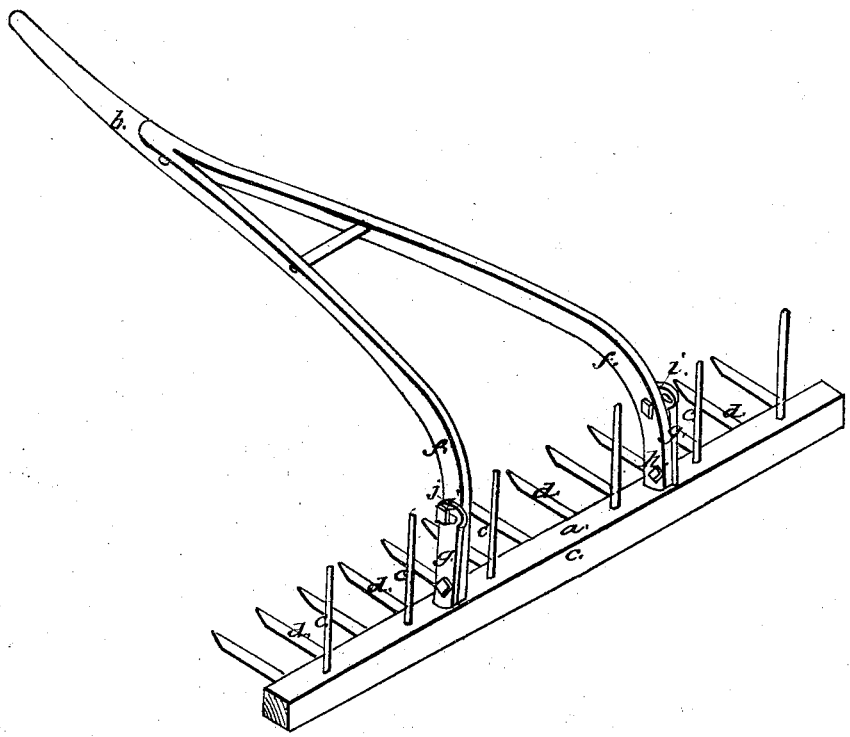
Witnesses:
Geo. A. Laming.
Edward Griffith.
Inventor:
H. F. Morton.
by
Frederick Curtis
Attorney

H. F. MORTON, OF WEST SUMNER, MAINE.

Letters Patent No. 88,325, dated March 30, 1869.

IMPROVEMENT IN DRAG-RAKES.

The Schedule referred to in these Letters Patent and making part of the same.

*To all to whom these presents shall come:*

Be it known that I, H. F. MORTON, of West Sumner, in the county of Oxford, and State of Maine, have made an invention of a new and useful Improvement in Farmers' "Drag-Rakes;" and do hereby declare the following to be a full, clear, and exact description thereof, due reference being had to the accompanying drawing, which is a perspective representation of a drag-rake containing my invention or improvement.

This invention is an improvement upon a species of large rake, known as "drag-rakes," or those which are drawn along the surface of the ground by the hands of a laborer, and relates to means for adjusting the angle, or inclination of the handle of the rake, with respect to its teeth, and to the height of the laborer, in order to maintain such teeth in parallelism, or thereabout, with the surface of the ground, whatever the stature of the laborer may be.

The invention consists in swivelling the extremities of the prongs of the forked handle of the rake to its head, or to uprights fixed thereupon, and combining with such prongs and uprights, a means of fixing the relative position of the rake-handle, with respect to the head, after being properly adjusted, the whole being as hereinafter explained.

In the drawing, before mentioned as accompanying this specification, and illustrating my invention, a drag-rake is shown as composed of a head, $a$, and handle $b$, the back, or bar of the former being seen at $c$, its teeth at $d\ d$, &c., and its upright stakes at $c\ c\ c$, &c., these parts being made and combined in the usual manner, with the exception that, in carrying out my invention, I apply to the upper surface of such back, two uprights, as shown at $g\ g$, and to the lower part of these uprights, I pivot the lower extremities of the prongs $f\ f$ of the handle, as shown at $h\ h$, the upper part of said uprights having short horizontal slots $i\ i$, made through them, for reception of the bolts $j\ j$, which are passed through them and the prongs, such bolts being provided with a nut or clamp-screw, for confining the prongs, and consequently the handle, to such uprights.

It will be evident that the relative positions of the pivots $h\ h$ and bolts $j\ j$ may be reversed, without affecting the character of my invention, the value of which, although at first glance appearing slight, will be apparent when the fact is taken into consideration, that if the back of the rake and the base of the teeth are raised above the surface of the ground, the points of the latter take into the earth, and are broken off, while, on the contrary, if the points of the teeth are elevated above the surface of the ground, more or less hay is passed over, and not taken up by the rake.

As before premised, my mode of pivoting and securing the handle of the rake to its head, enables me to so adjust the inclination of the former to the height of the laborer, as to maintain the teeth in parallelism, or thereabout, with the surface of the sward, while the rake is being drawn over it, thus obviating, as last above explained, the objections to the ordinary construction of such implements.

Claim.

What I claim, and desire to secure by Letters Patent, is—

A drag-rake, the head and handle of which are connected or swivelled together, substantially in the manner and by the means herein shown and described, whereby the angle at which the handle stands to the head may be varied at pleasure, for the purposes set forth.

H. F. MORTON.

Witnesses:
A. E. BESSEY,
G. B. CROCKETT.